Sept. 13, 1938.   L. E. JONES   2,129,772
HAND TRUCK
Filed Nov. 2, 1936   2 Sheets-Sheet 1

INVENTOR.
Lloyd. E. Jones.
BY Philip G. Minnis
ATTORNEY.

Sept. 13, 1938.  L. E. JONES  2,129,772
HAND TRUCK
Filed Nov. 2, 1936  2 Sheets-Sheet 2
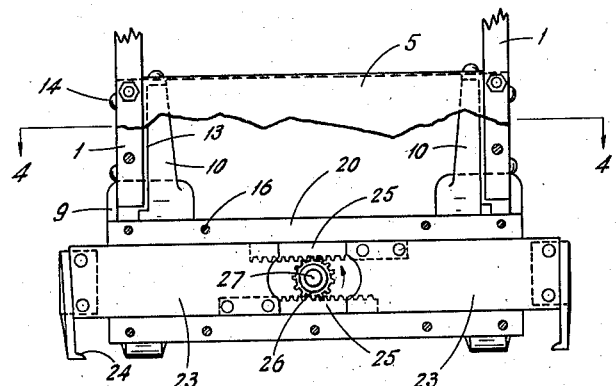
Fig. 3.
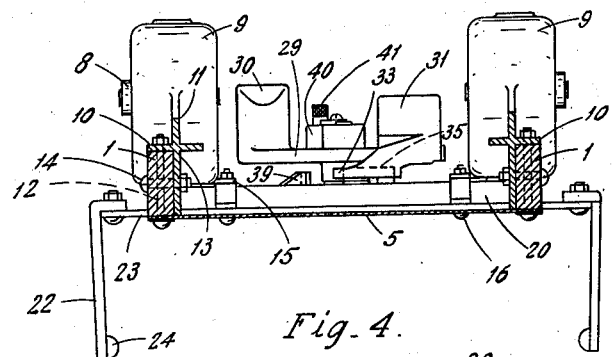
Fig. 4.
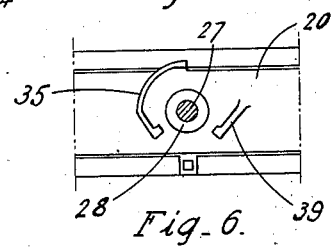
Fig. 6.
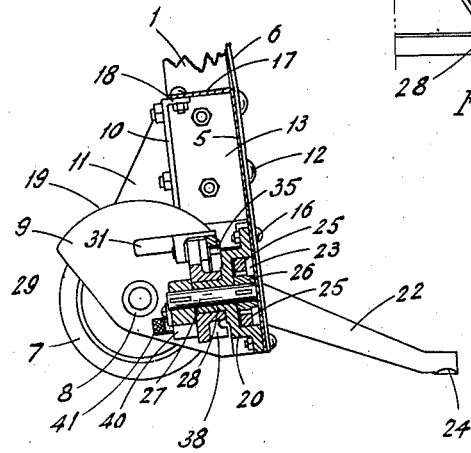
Fig. 5.
Fig. 8.
Fig. 7.
INVENTOR.
Lloyd. E. Jones.
BY Philip A. Minnis
ATTORNEY.

Patented Sept. 13, 1938

2,129,772

UNITED STATES PATENT OFFICE 2,129,772

HAND TRUCK

Lloyd E. Jones, Dunedin, Fla., assignor to Food Machinery Corporation, San Jose, Calif., a corporation of Delaware Application November 2, 1936, Serial No. 108,697

15 Claims. (Cl. 214—65.5)

This invention relates to hand trucks such as employed for trucking boxes, crates, or other articles, and has for its general object the provision of a hand truck embodying an improved form of load gripping mechanism.

Another object of the invention is to provide a hand truck with a load gripping mechanism embodying an improved means of adjustment, whereby its capacity may be varied for accommodating loads of different widths.

A further object is to provide a hand truck with an adjustable load gripping mechanism of simplified and inexpensive construction, and which is easy to operate, and readily adjustable with a minimum of time and effort.

Another object is to provide a hand truck with an adjustable load gripping mechanism of rugged and compact construction whereby it occupies a minimum of space, and is susceptible of rough usage without getting out of order.

It is also an object of the invention to provide a hand truck which is easy and convenient to operate and maneuver.

Other objects and advantages in addition to those specifically enumerated, may best be understood by reference to the following description of a preferred embodiment of the invention taken in connection with the accompanying drawings wherein, Fig. 1 is a rear elevation of a hand truck embodying the various features of the invention.

Fig. 3 is a fragmentary front elevation of the truck with certain parts broken away to facilitate illustration of certain details of construction.

Fig. 4 is a sectional plan view of the parts shown in Fig. 3 as viewed along the line 4—4.

Fig. 5 is a sectional elevation as viewed along the line 5—5 of Fig. 1.

Fig. 6 is a partial rear elevation of the housing cover with the treadle removed.

Fig. 7 is an enlarged sectional view of the adjustable driving mechanism as seen along the line 7—7 of Fig. 1.

Fig. 8 is an enlarged perspective view of the locking pin forming a part of the adjustable driving mechanism.

Figures 1, 2:
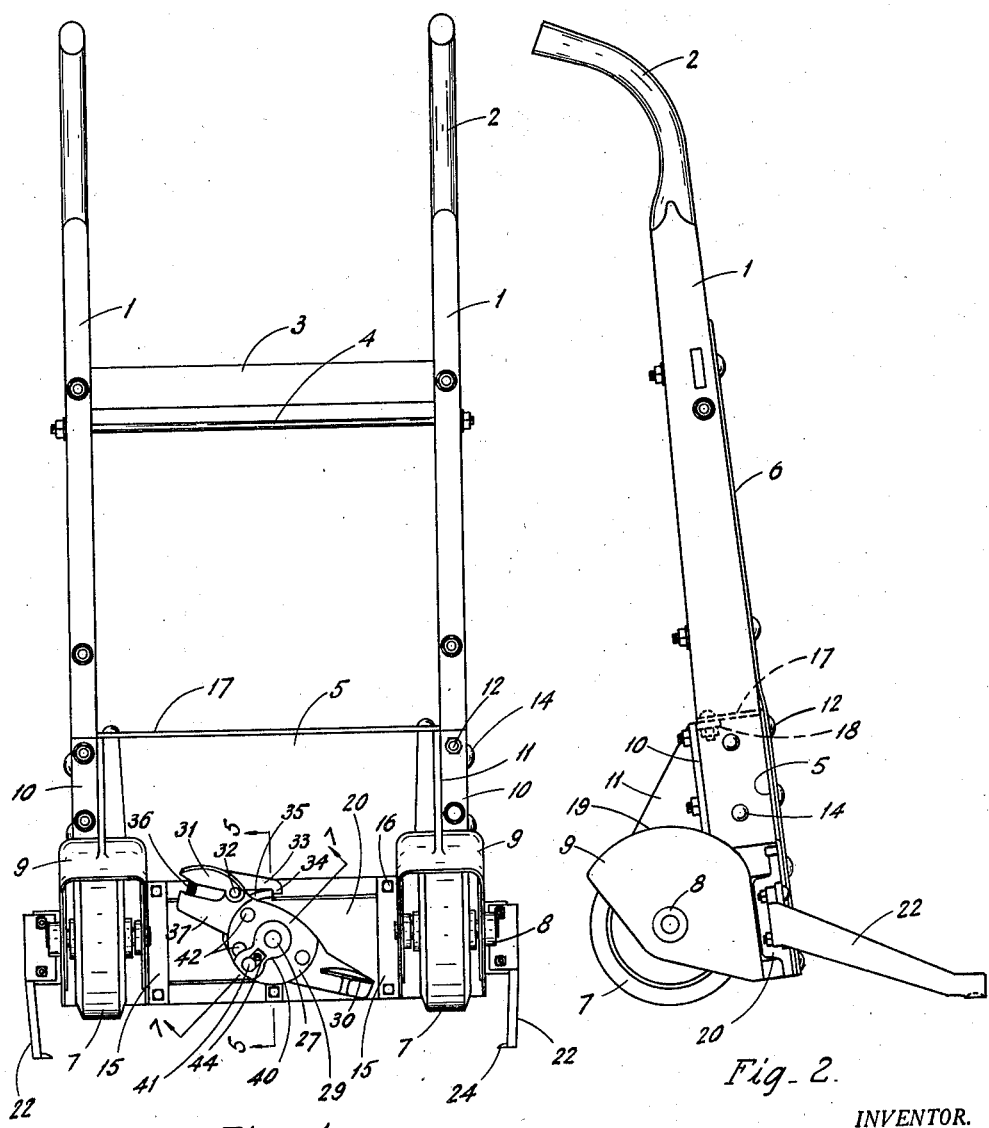
Fig. 2 is a side elevation of the hand truck illustrated in Fig. 1.

The hand truck disclosed in the illustrative embodiment includes a truck frame made up of side rails 1 formed at their upper ends to provide curved handles 2, and rigidly secured together in spaced apart relation by cross brace 3, tie rod 4, and at their lower ends by a rectangular cover plate 5, which also forms part of a housing for the load gripper operating mechanism presently to be described. The usual metal protective strips 6 may be applied to the forward sides of the side rails to protect them against excessive wear.

The lower, or forward end of the truck frame is provided with rubber tired wheels 7, journalled in bearings 8 carried by wheel housings or hoods 9, which are rigidly secured to the side rails 1 by means of upstanding brackets 10 formed integral with the wheel hoods and suitably reenforced by webs 11. These brackets are bolted to the side rails 1 as by bolts 12, and have forwardly projecting wing plates 13 formed integrally therewith and likewise bolted to the side rails 1 by bolts 14. The hoods 9 are also provided with laterally projecting flanges 15 secured to the cover plate 5 by bolts 16, and additional rigidity is imparted to the assembly by bending the upper portion of the cover plate rearwardly between the side rails as at 17 and bolting it to lugs 18 carried by the brackets 10.

The hoods 9, in addition to journalling the truck wheels 7, also effectively protect them from sand, dirt and dust. The tops of the wheel hoods are also preferably curved as at 19, and extend rearwardly of the wheel axis a substantial distance, thereby providing a very convenient foot rest for the operator to facilitate tilting the truck, both in picking up and setting down a load, and in starting the truck from rest.

A generally channel shaped housing 20, extending laterally of the truck at its forward end, is secured against the rear face of the cover plate 5, as by the bolts 16, and cooperates therewith to house a portion of the actuating mechanism for a pair of opposed load grippers made up of a pair of gripper arms 22, projecting to the front of the truck from opposite sides of its forward end, and carried on the outer ends of a pair of slide bars 23, slidably mounted for lateral shifting movement in the housing 20 which forms a guide therefor. The gripper arms 22 are provided with spurs 24 for insertion beneath, or into the sides of a box or the like to be lifted, and are preferably detachably secured to the slide bars 23 as shown, so that they may be replaced with different styles of gripper arms when desired.

The operating mechanism for the load grippers includes a pair of racks 25 secured to the respective slide bars 23 within the housing 20, so as to intermesh with a driving pinion 26 keyed to the inner end of a drive shaft 27, which is journalled in a sleeve bearing 28 formed on the housing, and projects rearwardly therethrough for actuation by a treadle 29.

The treadle 29 is loosely journalled on the sleeve bearing 28 and is provided with a pair of pedals 30 and 31, the former being formed integral with the hub of the treadle, and the latter being pivotally secured thereto as at 32. The pivoted pedal 31 carries a latch finger 33 provided with a hooked end 34 for engagement with a stop formed by the upper end of a curved flange 35 formed on the rear face of the housing, and a spring 36 interposed between the pedal 31, and an arm 37 carried by the treadle hub, serves to normally urge the latch finger 33 into latching engagement with the end of the flange 35.

As best seen in Fig. 6, the flange 35 extends a substantial distance around the treadle axis, and its lower end also forms a stop for engagement by a lug 38 on the back of the treadle (see Figs. 5 and 7) to limit oscillation of the treadle in a clockwise direction as viewed from the rear of the truck. Another stop, formed by a boss 39 on the housing, is also engageable by the lug to limit oscillation of the treadle in the other direction.

The treadle 29 may be operatively connected to the drive shaft 27 in a plurality of selected positions of rotative adjustment, by means of a clutch mechanism including a crank 40 secured to the outer end of the drive shaft, and provided with a releasable locking pin 41 for engagement with any one of a series of recesses 42 formed in the dial-like face of the treadle.

The locking pin 41, as best seen in Figs. 7 and 8, is transversely slotted as at 43, to receive a small stop plate 44 secured to the face of the crank 40, and a coil spring 45 seated in a recess 46 in the body of the locking pin, bears against the underside of the stop plate 44 so as to normally hold the locking pin in engagement with one of the locking recesses 42 in the treadle. When the locking pin is withdrawn from engagement with the treadle, as when changing the adjustment of the treadle with respect to the drive shaft, it can be temporarily locked in retracted position by twisting it so that the stop plate 44 enters a second and deeper transverse slot 47 in the pin.

It will be understood that the locking pin 41 is normally seated in one of the locking recesses 42 in the hub of the treadle 29, thereby locking the treadle to the drive shaft 27. When it is desired to move a load, such as a stack of boxes for example, the operator steps on the pedal 31 of the treadle, thereby releasing the latch finger 33 and rotating the treadle, as well as the drive shaft 27 to which it is locked, in an anti-clockwise direction as viewed in Fig. 1 so as to move the load grippers apart to the limit of the movement permitted by the stop 39 which limits rotation of the treadle by engagement with the lug 38 on the rear of the treadle. When the truck is then moved into operative relation with the load, the operator steps on the pedal 30, thereby rotating the treadle clockwise back to its original position, during which movement the load grippers engage and clamp the load to be trucked, and the grippers are firmly locked in clamping position by the latch 33 which again engages the upper end of the stop flange 35 when the grippers are brought together in load gripping position.

When it is desired to change the spacing of the load grippers to accommodate loads of varying width, it is only necessary for the operator to withdraw the locking pin 41 against the tension of its associated spring 45, so as to disengage the crank 40 from the treadle 29, whereupon either the crank or the treadle may be rotated relative to the other to bring the locking pin into registration with whichever one of the locking recesses 42 as may be desired, thereby repositioning the load grippers closer together or farther apart, as the case may be. The truck may then be operated as before.

During the adjustment, the locking pin may be locked in retracted position by twisting it after it has been withdrawn, so as to bring the stop plate 44 into engagement with the slot 47 in the pin.

It is believed that the construction and operation of the hand truck embodying my invention will be apparent from the foregoing description, and it will be understood that while I have illustrated a preferred embodiment of the invention, various alterations and modifications may be made therein without departing from the scope of the invention, and I deem myself entitled to all such alterations and modifications as fall within the scope of the claims appended hereto.

Having now described my invention and in what manner the same may be used, what I claim as new and desire to secure by Letters Patent is:

1. A hand truck comprising a truck frame provided with supporting wheels, a pair of opposed load grippers operable laterally of the frame, unitary driving means for actuating said grippers toward and away from each other, a treadle for operating said driving means, and means for adjusting the operative relation between said treadle and driving means to vary the spacing of the grippers for accommodating loads of different widths.

2. A hand truck comprising a truck frame provided with supporting wheels, a pair of opposed load grippers operable laterally of the frame, means including a drive shaft for actuating said grippers toward and away from each other, a treadle for actuating said drive shaft, and means for interlocking said treadle and drive shaft, said interlocking means being adjustable to vary the operative relation between said treadle and drive shaft whereby to vary the spacing of the grippers for accommodating loads of differing widths.

3. A hand truck comprising a truck frame provided with supporting wheels, a pair of opposed load grippers operable laterally of the frame, means including a drive shaft for actuating said grippers toward and away from each other, a treadle for actuating said drive shaft, a clutch mechanism for operatively interconnecting said shaft and treadle, and means for adjusting said clutch mechanism to vary the operative relation between said treadle and drive shaft whereby to vary the spacing of the grippers for accommodating loads of differing widths.

4. A hand truck comprising a truck frame provided with supporting wheels, a pair of opposed load grippers operable laterally of the frame, means including a drive shaft for actuating said grippers toward and away from each other, a treadle for actuating said drive shaft, and means for operatively interconnecting said treadle and drive shaft in a plurality of selected positions of rotative adjustment.

5. A hand truck comprising a truck frame provided with supporting wheels, a pair of opposed load grippers operable laterally of the frame, a pair of racks associated with said grippers, a pinion meshing with said racks for actuating the grippers toward and away from each other, a treadle for driving said pinion, and means for operatively interconnecting said treadle and pinion in a plurality of selected positions of rotative adjustment.

6. A hand truck comprising a truck frame provided with supporting wheels, a pair of opposed load grippers operable laterally of the frame, means including a drive shaft for actuating said grippers toward and away from each other, a treadle for actuating said drive shaft, and means including a releasable locking pin for locking said treadle and drive shaft together in a plurality of selected positions of rotative adjustment.

7. A hand truck comprising a truck frame provided with supporting wheels, a pair of opposed load grippers operable laterally of the frame, means including a drive shaft for actuating said grippers toward and away from each other, a crank member secured to said drive shaft, a treadle member loosely journalled for oscillation about the axis of said shaft, one of said members being provided with a plurality of locking recesses, and a releasable locking pin associated with the other of said members for selectively engaging with said locking recesses to lock said treadle and crank together in a plurality of selected positions of rotative adjustment.

8. A hand truck comprising a truck frame provided with supporting wheels, a pair of opposed load grippers operable laterally of the frame, means including a drive shaft member for actuating said grippers toward and away from each other, a treadle member loosely journalled for oscillation about the axis of said drive shaft, a withdrawable locking pin carried by one of said members for selective engagement with a plurality of locking recesses in the other member, and yieldable means associated with said locking pin for normally holding it in locking engagement with one of said recesses.

9. A hand truck comprising a truck frame provided with supporting wheels, a pair of opposed load grippers, operable laterally of the frame means including a drive shaft for actuating said grippers toward and away from each other, a crank member secured to said drive shaft, a treadle member loosely mounted for oscillation about the axis of said shaft, one of said members being provided with a plurality of locking recesses, a withdrawable locking pin rotatably journalled in the other of said members for selectively engaging with said locking recesses to lock said treadle and crank together in a plurality of selected positions of rotative adjustment, a spring associated with said locking pin for normally holding the pin seated in one of said recesses, and a stop associated with said locking pin, said locking pin being provided with a shoulder for engagement with said stop to hold said pin when withdrawn and rotated to bring the shoulder into operative engagement with the stop.

10. A hand truck comprising a truck frame provided with supporting wheels, a pair of opposed load grippers operable laterally of the frame, means including a drive shaft for actuating said grippers toward and away from each other, a treadle mounted coaxially of said shaft and provided with a pair of pedals, one of said pedals being pivotally secured to said treadle and provided with a latch, and a catch for engagement with said latch to lock the treadle against movement when the latter is actuated to draw the grippers together in load gripping position, stop means for limiting movement of the treadle, and means for operatively interconnecting said treadle and shaft in a plurality of selected positions of rotative adjustment.

11. A hand truck comprising a truck frame provided with supporting wheels, a pair of oppositely disposed load grippers slidably mounted for shifting movement laterally of said frame, a pair of racks respectively associated with said grippers, a pinion intermeshing with said racks for moving said grippers toward and away from each other, a crank shaft for operating said pinion, a treadle loosely journalled coaxially of said crank shaft, a pedal pivotally secured to said treadle, a latch carried by said pedal, a stop for engagement with said latch to lock said treadle, a crank carried by said crank shaft, and an adjustable locking pin for selective engagement with a plurality of recesses in said treadle to lock said treadle and crank together in adjusted positions whereby to vary the spacing of said load grippers.

12. A hand truck comprising a truck frame provided with supporting wheels, a pair of opposed load grippers operable laterally of the frame, driving means for actuating said grippers toward and away from each other, a treadle for operating said driving means, means for adjusting the operative relation between said treadle and the driving means to vary the spacing of the grippers for accommodating loads of different widths, and a releasable latch associated with said treadle for maintaining said load grippers in active position.

13. An adjustable connection of the character described, comprising a pair of members associated with each other for relative adjusting movement, one of said members being provided with a plurality of locking recesses, a withdrawable locking pin rotatably journalled in the other of said members for selectively engaging with said locking recesses to lock said members together in a plurality of selected relatively adjusted positions, a spring associated with said locking pin for normally holding the pin seated in one of said recesses, and a stop associated with said locking pin, said locking pin being provided with a shoulder for engagement with said stop to hold said pin when withdrawn and rotated to bring the shoulder into operative engagement with the stop.

14. An adjustable connection of the character described, comprising a pair of members associated with each other for relative adjusting movement, one of said members being provided with a locking recess, a withdrawable locking pin rotatably journalled in the other of said members for engaging with said locking recess to lock said members together, a spring associated with said locking pin for normally holding the pin seated in said recess, and a stop associated with said locking pin; said locking pin being provided with a shoulder for engagement with said stop to hold said pin when withdrawn and rotated to bring the shoulder into operative engagement with the stop.

15. An adjustable connection of the character described, comprising a pair of members associated with each other for relative adjusting movement, one of said members being provided with a plurality of locking recesses, a withdrawable locking pin rotatably journalled in the other of said members for selectively engaging with said locking recesses to lock said members together in a plurality of selected relatively adjusted positions, a spring associated with said locking pin for normally holding the pin seated in one of said recesses, and a stop associated with said locking pin, said locking pin being recessed to provide a pair of axially offset shoulders for engagement with said stop, one of said shoulders being engaged with said stop with said pin in operative recess engaging position, and the other of said shoulders being adapted to hold said pin when withdrawn and rotated to bring the shoulder into operative engagement with the stop.

LLOYD E. JONES.